US006393308B1

(12) United States Patent
Isomichi et al.

(10) Patent No.: US 6,393,308 B1
(45) Date of Patent: *May 21, 2002

(54) PAGER WITH AUTO POWERUP FOR MESSAGE RECEIPT

(75) Inventors: Yasuhiro Isomichi; Shigeru Uchiyama, both of Kanagawa (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,212

(22) Filed: Jun. 19, 1998

(30) Foreign Application Priority Data

Jul. 23, 1997 (JP) .............................................. 9-197360

(51) Int. Cl.[7] .............................. H04Q 7/02; G08B 3/10

(52) U.S. Cl. ......................... 455/701; 455/703; 340/7.3; 340/7.4

(58) Field of Search ............................... 455/31.1, 38.3; 340/825.44, 825.22; 370/311

(56) References Cited

U.S. PATENT DOCUMENTS 4,860,005 A * 8/1989 DeLuca et al. ........ 340/825.44
5,726,639 A * 3/1998 Romero et al. ........ 340/825.22
5,924,017 A * 7/1999 Pinter et al. ............... 455/38.3
5,977,881 A * 11/1999 Kido ..................... 340/825.44
6,011,955 A * 1/2000 Tsuchiyama ............... 455/38.4

FOREIGN PATENT DOCUMENTS

JP 5259966 10/1993

* cited by examiner

*Primary Examiner*—Daniel Hunter
*Assistant Examiner*—Alan T. Gantt
(74) *Attorney, Agent, or Firm*—Pearne & Gordon LLP

(57) ABSTRACT

A pager unit that can receive a message when it is turned off. A power supply of the pager unit is turned on by a control unit prior to the time scheduled to receive a message, and then turned of f after the message has been received. Accordingly, the pager can receive a message during the time it is scheduled to be turned off, conserving battery power while allowing it to receive scheduled messages. The receiving time for receiving messages can be arbitrarily set via a time-setting changing message received while the pager is turned on.

19 Claims, 4 Drawing Sheets

| CASE | ON/OFF TIME | MESSAGE RECEIVING TIME |
|---|---|---|
| 1 | 7:00/20:00 | 4:00 |
| 2 | 7:00/20:00 | 7:00 |
| 3 | 7:00/20:00 | 12:00 |
| 4 | 7:00/20:00 | 20:00 |
| 5 | NO SETTING, ON | 12:00 |
| 6 | NO SETTING, OFF | 12:00 |

PAGER WITH AUTO POWERUP FOR MESSAGE RECEIPT

BACKGROUND OF THE INVENTION

The present invention relates to a pager whose power supply is automatically turned on when the time approaches the time stored in the pager to receive a message, and whose power supply is automatically turned off again after the reception of the message.

A pager is generally used by an individual to call up another and is often used while the user is awake, and few people send messages at midnight. The pager is so adapted that the power supply of a receiving unit is normally turned on in correspondence with a receiving timing to extend the battery life, and it is checked as to whether any message addressed to the user has arrived. At other times, an attempt is made not to allow the current to flow as practically as possible such as by turning off the power supply to the receiving unit. If an attempt is made to further extend the battery life in this state, the user turns off the power supply before going to bed at night, and turns on the power supply in the morning. However, if the user forgets to turn on the power supply in the morning, the user cannot be paged. On the other hand, if the user forgets to turn off the power supply at night, it becomes impossible to extend the battery life. As such, a function has been proposed for automatically turning the power supply on and off when the time arrives, as disclosed in Japanese Patent Publication 5-259966/(1993).

FIG. 7 is a block diagram illustrating the configuration of a conventional pager. In FIG. 7, reference numeral 1 denotes a power supply unit in which voltage is converted to a fixed voltage by, for example, using a battery to supply power to each block. Numeral 2 denotes a receiving unit which receives a radio wave transmitted to the pager, and demodulates and decodes the same to fetch a signal. If the fetched signal is addressed to the user, the user is notified that a message has arrived by sounding a melody by using a alarm unit 4 through a control unit 3 constituted by a CPU, or by flashing an LED, and the message is displayed on a display unit 5 by using an LCD or the like. Numeral 6 denotes a storage unit which stores data on the time for turning on the power supply and the time for turning it off.

The control unit 3 sets in the storage unit 6 the time for controlling the power supply and the type of on/off at that time, and when the set time arrives, the control unit 3 controls the supply of power from the power supply unit 1 to the receiving unit 2 in accordance with the designated type of on and off. Numeral 7 denotes an input unit which effects operation including the designation of the time.

Referring to FIG. 7, a description will be given of the procedure for turning on and off the power supply in accordance with the conventional art.

The user inputs the time for turning on the power supply and the time for turning it off by using the input unit 7 constituted by push switches, for example. Such data is stored in the storage unit 6 which is constituted by, for example, an SRAM. When the time for turning off the power supply, which is stored in the storage unit 6, arrives, the control unit 3 controls the power supply unit 1 to stop the supply of power to the receiving unit 2. Then, when the time for turning on the power supply arrives, the control unit 3 controls the power supply unit 1 to supply power to the receiving unit 2.

However, services of the pager have become diversified, and services have begun whereby various information is provided to subscribers by service providers. At that time, there are cases where the transmitting side transmits information during specific time during the night when the traffic in not congested. At that time, if the power supply of the pager is not turned on, a message cannot be received. On the other hand, if the power supply is kept on, the message can be received, but the battery of the pager is wasted at other time. In addition, even if the user sets the pager in advance so that the power supply is turned on at the time when information is received, in a case where the service provider wishes to change the transmitting time depending on the condition of traffic, there arises a need to notify the user, and it is troublesome for the user to alter the setting.

SUMMARY OF THE INVENTION

The present invention aims to overcome the above-described problems, and its object is to provide an excellent pager whose power supply is automatically turned on when the time approaches the time for receiving a message described in a program, whose power supply is automatically turned off after reception of the message so as to allow the message to be received reliably without shortening the battery life by turning on the power supply only when necessary, and which allows the service provider to transmit a message for altering the setting of the pager's receiving time when the transmitting time has been changed, thereby making it possible to change the time for turning on the power supply without troubling the user.

To attain the above object, in accordance with the present invention, there is provided a pager comprising: storage means for storing time data designating receiving time for receiving a message; and control means including reception-operation control means for turning a power supply of the pager on or off as a result obtained by comparison between the time designated by the time data and the present time. Accordingly, a meritorious effect is obtained in that even if the power supply of the pager is off, as for a message the receiving time of which is known in advance, when the time approaches that time, the power supply of the pager is turned on, so that the message can be received reliably. Therefore, it is possible to prevent a reception error due to the failure to turn on the power supply with respect to a message the receiving time of which is known.

Further, since receiving-time setting means is provided for arbitrarily changing the time designated in the time data by using a message received by the pager, even if the time for transmitting a message has been changed, a service provider sends a message for changing the setting of the receiving time of the pager, so that it is possible to change the time for turning on the power supply without troubling the user.

As described above, since the power supply of the pager is automatically turned on in correspondence with the time for receiving a message, and the power supply is automatically turned off after the reception of the message, the message can be received reliably without shortening the battery life by turning on the power supply only when necessary. Even if the transmitting time has been changed, as the service provider sends a message for changing the setting of the receiving time of the pager, the time for turning on the power supply can be changed without troubling the user.

In addition, in the pager, the control means has automatic setting-operation means for automatically turning the power supply of the pager on and off at the time designated in advance, and the reception-operation control means is operated by placing priority on the receiving time if the receiving time is included in a time duration from the time the power supply is turned off by the automatic setting-operation means until the time the power supply is turned on by the automatic setting-operation means. Accordingly, a meritorious effect is obtained in that even if the power supply of the pager is off due to the setting of the pager, as for a message the receiving time of which is known in advance, when the receiving time arrives, the power supply is turned on, so that the message can be received.

In addition, in the pager, since the reception-operation control means turns on the power supply at a fixed timing before the receiving time, a meritorious effect is obtained in that the synchronization of the pager is effected reliably, and the probability of reception is increased.

DETAILED DESCRIPTION OF THE PREFERRED EMBODIMENTS

Referring now to FIGS. 1 to 4, a description will be given of the embodiments of the present invention. (First Embodiment)

Figure 1:
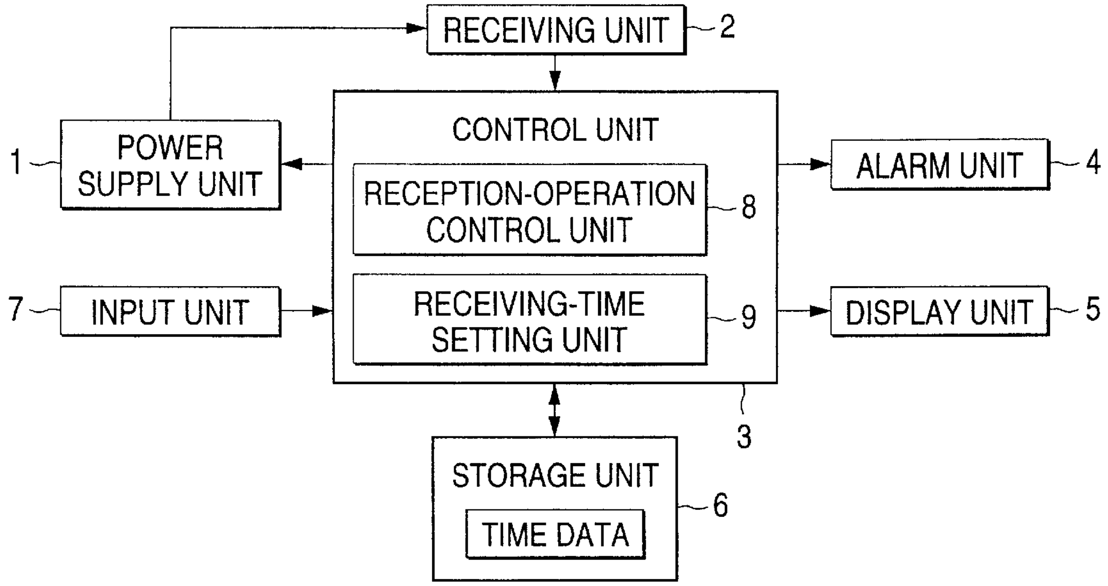
FIG. 1 is a block diagram illustrating the configuration of a pager in accordance with a first embodiment of the present invention.
Figure 2:
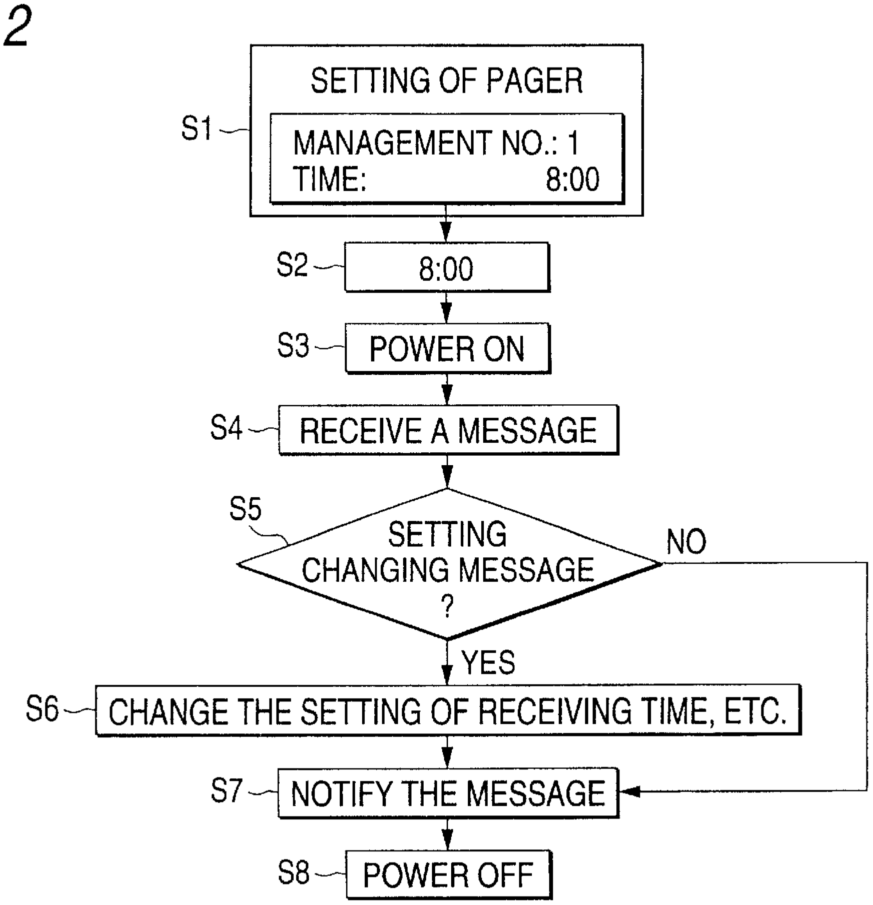
FIG. 2 is a flowchart illustrating the flow of operation in accordance with the first embodiment of the present invention.

FIG. 1 is a block diagram illustrating the configuration of a pager in accordance with a first embodiment of the present invention. FIG. 2 is a flowchart illustrating the flow of operation.

In FIG. 1, reference numeral 1 denotes a power supply unit which effects the supply of power to each block. The power supply unit 1 is made up by a battery and a power supplying circuit, and effects the supply of power to each block or stops the supply in accordance with a designation from a control unit 3. Numeral 2 denotes a receiving unit which operates in correspondence with its own receiving timing, demodulates and decodes the received radio wave, and transmits to the control unit 3 a message, if any, addressed to the user. An alarm unit 4 notifies the user of the arrival of the message by using a buzzer, an LED, or the like, and the received message is displayed on the screen of such as an LCD by using a display unit 5. Numeral 6 denotes a storage unit which is constituted by a writable memory such as an SRAM, a flash ROM, or an EEPROM. Time data on the turning on and off of the power supply of the pager and a program for processing fixed-time receiving messages are stored therein. Numeral 7 denotes an input unit which is constituted by, for example, push switches, and effects the operation of such as displaying a received message. Numeral 8 denotes a reception-operation control unit, and numeral 9 denotes a receiving-time setting unit. The reception-operation control unit 8 and the receiving-time setting unit 9 are formed by control programs, and are included in the control unit 3.

Figure 3:
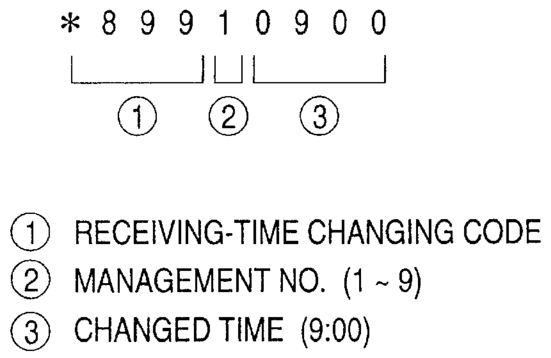
FIG. 3 is a diagram illustrating an example of a format of a message for changing the receiving time in accordance with the first embodiment of the present invention.

FIG. 3 shows an example of a time-setting changing message, wherein "*899" is a header representing the change of the scheduled time for receiving a message, an ensuing digit "1" is a management number for classifying a plurality of messages, and "0900" represents the new scheduled time for receiving a message (9 a.m.).

Next, referring to FIGS. 1 to 3, a description will be given of an example of operation.

Data that information is to be received at 8:00 is stored in advance in the storage unit 7 in FIG. 1 (S1). When the time of the internal clock of the pager reaches 8:00 (S2), the reception-operation control unit 8 controls the power supply unit 1 to supply power to the receiving unit 2 (S3). After the power supply of the pager is supplied, a message is received (S4). Then, the receiving-time setting unit 9 checks the kind of the received message (S5), and if it is an ordinary message, the owner of the pager is notified that there has been a reception by flashing the LED or sounding a buzzer in the alarm unit 4, and the message is displayed on the display unit 5 (S7). After the reception of the message, the reception-operation control unit 8 controls the power supply unit 1 to stop the supply of power to the receiving unit (S8).

If the received message is a time-setting changing message, the receiving time data stored in the storage unit 6 is rewritten (S6). For example, in a case where the message shown in FIG. 3 has been received, the receiving time data is rewritten from 8:00 to 9:00, and is displayed on the display unit 5 (S7). Subsequently, the reception-operation control unit 8 controls the power supply unit 1 to stop the supply of power to the receiving unit (S8).

As a result, the user is able to understand that there has been an omission of a call. Then, if the user presses a switch in the input unit 7, a message is displayed to the effect that "A request is made for retransmission of a message. Are you ready?" (S7). Here, if the user applies a DTMF output port of the pager to the mouthpiece of a telephone, and presses the switch of the input unit 7 again, a message-retransmit requesting unit (not shown) converts the addressee data fetched from transmitter information in the storage unit 6 to a DTMF signal, and outputs the signal via a DTMF-signal transmitting means (not shown).

It should be noted that after the change of the time setting, a message may be displayed to the effect that "The time setting has been changed."

(Second Embodiment)

Figure 4:
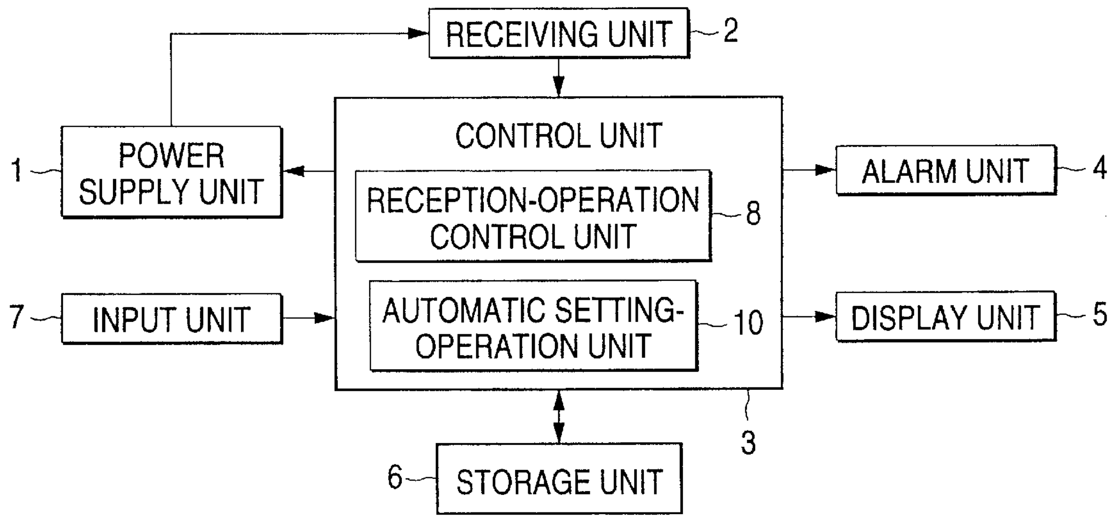
FIG. 4 is a block diagram illustrating the configuration of a pager in accordance with a second embodiment of the present invention.
Figure 5:
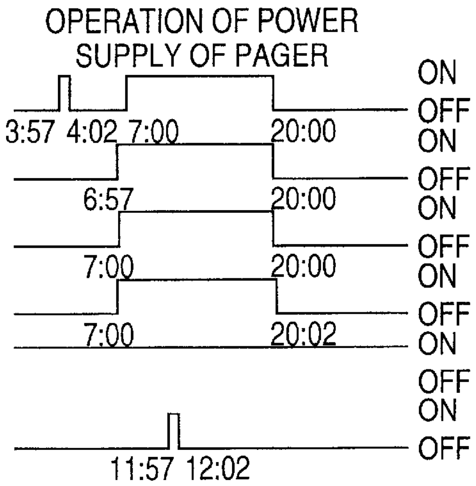
FIG. 5 is a timing diagram illustrating the difference in operation of a pager power supply unit due to the setting of the turning on and off of the power supply and a set pattern of the message receiving time in accordance with the second embodiment of the present invention.

FIG. 4 is a block diagram illustrating the configuration of a pager in accordance with a second embodiment of the present invention. FIG. 5 is a timing diagram illustrating the difference in operation of the pager power supply unit due to the setting of the turning on and off of the power supply and a set pattern of the message receiving time.

In FIG. 4, the blocks having the same functions as those of the above-described first embodiment (FIG. 1) are denoted by the same reference numerals, and a description thereof will be omitted. Here, the control unit 3 has an automatic setting-operation unit 10 which replaces the receiving-time setting unit 9 shown in FIG. 1, and the reception-operation control unit 8 and the automatic setting-operation unit 10 are formed by control programs, and are included in the control unit 3.

When the time approaches the given pager receiving time, the reception-operation control unit 8 controls the power supply unit 1 for turning the power supply of the pager on and off in accordance with the case shown in FIG. 5 by accompanying the operation of the automatic setting-operation unit 10. The timing at which the power supply of the pager is turned on is set to three minutes before the scheduled time for receiving a message, and the timing at which the power supply of the pager is turned off is set to two minutes after the scheduled time for receiving a message, for example.

In FIG. 5, in case 1, since the power supply of the pager is off during the scheduled time for receiving a message, the power supply of the pager is turned on three minutes before the scheduled time for receiving a message, and the power supply of the pager is turned off two minutes after the scheduled time for receiving a message.

In case 2, although a setting is provided such that the power supply is turned off by the reception-operation control unit 8 when the power supply is set to on by the automatic setting-operation unit 10, this setting is ignored, and power is supplied to the receiving unit 2 until the power supply is turned off by the automatic setting-operation unit 10 after the power supply is turned on by the reception-operation control unit 8.

In case 3, since the power supply of the pager is on during the scheduled time for receiving a message, the operation of turning the power supply on and off is effected in conformity with the operation of the automatic setting-operation unit 10.

In case 4, although a setting is provided such that the power supply is turned off by the automatic setting-operation unit 10 when the power supply is set to on by the reception-operation control unit 8, this setting is ignored, and power is supplied to the receiving unit 2 until the power supply is turned off by the reception-operation control unit 8.

In case 5, since the state is such that the power supply is always turned on, power is supplied to the receiving unit 2 irrespective of the state of the reception-operation control unit 8.

In case 6, since the state is such that the power supply is always turned off, the operation of turning the power supply on and off is effected in accordance with the operation of the reception-operation control unit 8.

Figure 6:
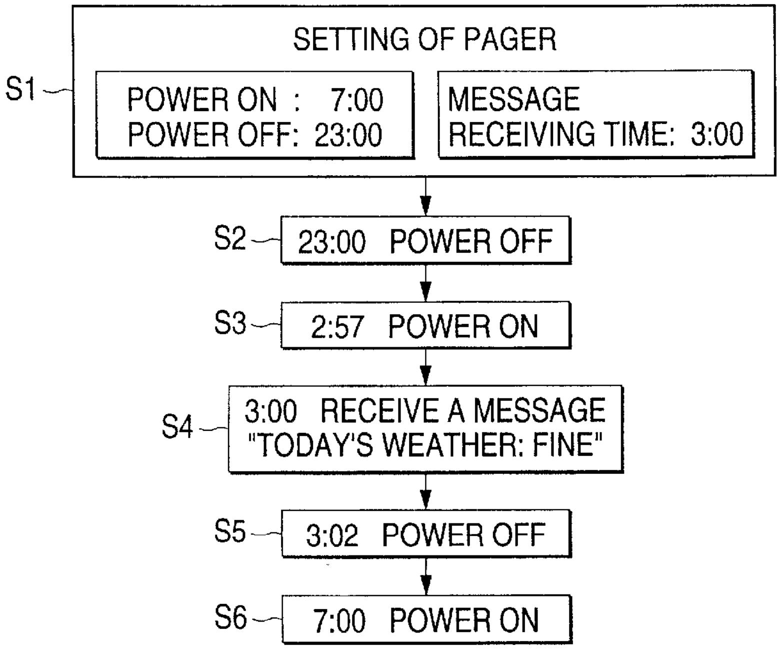
FIG. 6 is a flowchart illustrating the flow of operation in accordance with the second embodiment of the present invention.
Figure 7:
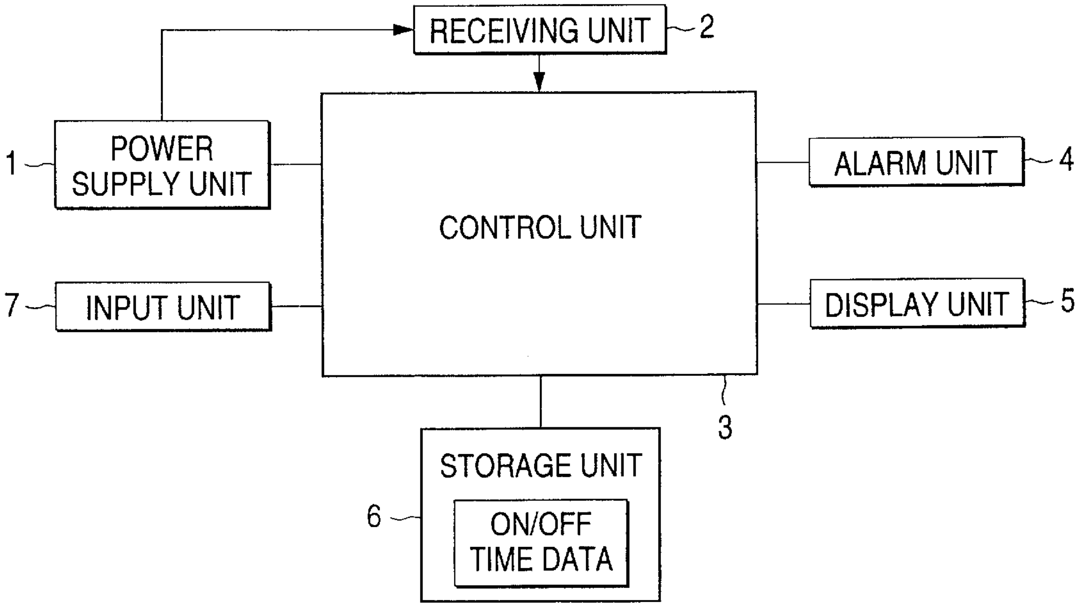
FIG. 7 PRIOR ART
FIG. 7 is a block diagram illustrating the configuration of a conventional pager.

Next, referring to FIGS. 4 and 6, a description will be given of the operation of this embodiment. FIG. 6 is a flowchart illustrating the flow of operation.

The power-on time of the pager is set to 7:00, the power-off time is set to 23:00, and the scheduled time for receiving a message is set to 3:00 (S1). At 23:00, the power supply of the pager is turned off by the automatic setting-operation unit 10 (S2). At 2:57, the power supply is turned on by the reception-operation control unit 8 to receive a message the receiving time of which is known, and the pager is set in a state capable of receiving the message (S3). At 3:00, the message is received (S4). At 3:00, the power supply is turned off (S5). At 7:00, the power supply is automatically turned on by the automatic setting-operation unit 10 (S6).

Here, although an example has been shown in which the number of messages received at the fixed time is one, the number of messages at a designated time may be plural. In addition, the function of automatically turning the power supply on and off may not be set. Furthermore, although the timing at which the power supply of the pager is turned off is set to two minutes after the scheduled time of reception, an arrangement may be provided such that the power supply is turned off immediately after a target message has been received correctly.

As described above, in accordance with the present invention, since even if the power supply is off, the power supply of the pager is turned on and off by being set to the time with respect to a message the receiving time of which is known, a message from an information service or the like can be received. Hence, the user is capable of setting the power supply off to extend the battery life of the pager. In addition, since a message of a specific format is received, the setting of the time for receiving a message can be altered, so that the user can be dispensed from the trouble of providing a setting on each such occasion. In addition, an advantage is obtained in that the service provider can be dispensed from the trouble of notifying the user of a change of the time.

What is claimed is:

1. A pager comprising:

a message receiving time storage unit for storing time data designating a predetermined receiving time to receive a message;

an automatic setting-operation control unit for automatically turning said pager on at an on time designated in advance and off at an off time designated in advance;

a reception-operation control unit for comparing the predetermined receiving time stored in said message receiving time storage unit with the current time, wherein, if the pager is off, said reception-operation control unit turns the pager on when said reception-operation control unit determines that it is time to receive said message, and further wherein said reception-operation control unit prevents said automatic setting-operation control unit from turning the pager off during the period that said reception-operation control unit has determined is time to receive said message.

2. A pager according to claim 1 wherein said reception-operation control unit turns the power supply of said pager off after receiving the message.

3. A pager according to claim 2 wherein said reception-operation control unit allows the pager to remain on when said automatic setting-operation control unit determines that the current time is a designated on time.

4. A pager according to claim 1 further comprising a receiving-time setting unit for arbitrarily changing the predetermined receiving time by using a message received by said pager.

5. A pager according to claim 3 further comprising a receiving-time setting unit for arbitrarily changing the predetermined receiving time by using a message received by said pager.

6. A pager according to claim 3 further comprising a receiving-time setting unit for arbitrarily changing the predetermined receiving time by using a message received by said pager.

7. A pager according to claim 1 wherein said reception-operation control unit turns on the power supply at a fixed time before the receiving time.

8. A pager according to claim 2 wherein said reception-operation control unit turns on the power supply at a fixed time before the receiving time.

9. A pager according to claim 3 wherein said reception-operation control unit turns on the power supply at a fixed time before the receiving time.

10. A pager according to claim 4 wherein said reception-operation control unit turns the pager on at a fixed time before the receiving time.

11. A pager according to claim 6 wherein said reception-operation control unit turns the pager on at a fixed time before the receiving time.

12. A pager according to claim 1 wherein said reception-operation control unit turns the pager off at a fixed time period after the pager has been turned on to receive a message.

13. A pager according to claim 3 wherein said reception-operation control unit turns the pager off at a fixed time period after the pager has been turned on to receive a message.

14. A pager according to claim 4 wherein said reception-operation control unit turns the pager off at a fixed time period after the pager has been turned on to receive a message.

15. A pager according to claim 6 wherein said reception-operation control unit turns the pager of f at a fixed time period after the pager has been turned on to receive a message.

16. A pager comprising:

a message receiving time storage unit for storing time data designating a predetermined receiving time to receive a message;

a receiving-time setting unit for arbitrarily changing the predetermined receiving time by using a message received by said pager;

an automatic setting-operation control unit for automatically turning said pager on at an on time designated in advance and off at an off time designated in advance;

a reception-operation control unit for comparing the predetermined receiving time stored in said message receiving time storage unit with the current time, wherein, if the pager is off, said reception-operation control unit turns the pager on when said reception-operation control unit determines that it is time to receive said message, and further wherein said reception-operation control unit prevents said automatic setting operation control unit from turning the pager of f during the period that said reception-operation control unit has determined is time to receive said message, and still further wherein said reception-operation control unit turns the pager off after receiving the message, unless the automatic setting-operation control unit determines that the current time is a designated an on time wherein the said reception-operation control unit allows the pager to remain on.

17. A pager according to claim 16, wherein said reception-operation control unit turns the pager on at a fixed time before the receiving time.

18. A pager according to claim 16, wherein said reception-operation control unit turns the pager off at a fixed time period after the pager has been turned on to receive a message.

19. A pager according to claim 13 wherein said reception-operation control unit turns the pager off at a fixed time period after the pager has been turned on to receive a message.

* * * * *

UNITED STATES PATENT AND TRADEMARK OFFICE
CERTIFICATE OF CORRECTION

PATENT NO. : 6,393,308 B1 
DATED : May 21, 2002
INVENTOR(S) : Yasuhiro Isomichi et al.

It is certified that error appears in the above-identified patent and that said Letters Patent is hereby corrected as shown below:

Title page,
Item [57], ABSTRACT,
Line 4, please delete "of f", and insert therefor -- off --.

Column 6,
Line 48, please delete "3", and insert therefor -- 2 --.

Column 7,
Line 17, please delete "of f", and insert therefor -- off --.

Column 8,
Line 10, please delete "of f", and insert therefor -- off --.

Signed and Sealed this

Seventh Day of January, 2003

JAMES E. ROGAN
*Director of the United States Patent and Trademark Office*

UNITED STATES PATENT AND TRADEMARK OFFICE

CERTIFICATE OF CORRECTION

PATENT NO. : 6,393,308 B1
DATED : May 21, 2002
INVENTOR(S) : Yasuhiro Isomichi et al.

It is certified that error appears in the above-identified patent and that said Letters Patent is hereby corrected as shown below:

Column 8,
Line 25, please delete "13", and insert therefor -- 17 --.

Signed and Sealed this

Twenty-ninth Day of April, 2003

JAMES E. ROGAN
*Director of the United States Patent and Trademark Office*